3,531,287
**COLOR SEPARATION FILM CONTAINING
LIGHT-ABSORBING DYE**
Eugene D. Salesin, Rochester, N.Y., assignor to Eastman
Kodak Company, Rochester, N.Y., a corporation of
New Jersey
No Drawing. Filed Jan. 16, 1967, Ser. No. 609,357
Int. Cl. G03c 1/84, 1/40
U.S. Cl. 96—84                17 Claims

ABSTRACT OF THE DISCLOSURE

Black-and-white panchromatically sensitized silver halide gelatin emulsion in which the red to green to blue exposure contrast relationship is adjusted by incorporating a removable light-absorbing dye having its principal absorption in the region of the spectrum to which the color exposure contrast is too high for color separation negative film designed for machine processing.

---

This application relates to photography, light-sensitive photographic material used for making color separations and improved processes for making color separations.

The photomechanical reproduction of a colored original typically involves the preparation of three color separations by photographing the original on three separate panchromatic films or plates, making one exposure through a red, a second through a green, and the third through a blue filter. The resulting latent images are processed to black-and-white separation images which are then used for the preparation of three separate printing plates. These printing plates are inked, each with a different subtractively colored ink and printed, in register, on paper. The plate made from the red filter separation is printed with cyan ink, the plate from the green separation with magenta ink, and the plate from the blue separation with yellow ink. In so-called four-color printing, a black-ink printing is added to the three colors to improve the sharpness and the density in the neutral areas of the reproduction. The black printer is made from a specially prepared black separation. Color separations are also used in other systems for color reproduction, for example, the color separation may be used to prepare wash-off-relief matrixes which are then dyed with dyes of the appropriate color and subsequently the dye images are transferred one at a time from the matrixes to a mordanted receiving sheet where the three dye images in register form the desired color reproduction.

In order that the color reproduction has the proper color balance, that is, for example, gray tones varying from white to black are reproduced as a series of gray densities, it is necessary that the sensitometric curves (relating developed density to log exposure) for the three color separations have the desired contrast relationships. Contrast refers to the slope of the straight line portion of the sensitometric curve and the expression blue exposure contrast, for example, is used to refer to the contrast of the image developed in the blue light-exposed separation. Ideally the contrasts of the red, green and blue separations should be the same, however, in practice it is preferred to have the green exposure contrast and the blue exposure contrasts approximately equal but lower than the red exposure contrast. Particularly troublesome is the situation where the relationship of the red to green to blue exposure contrasts is not correct for color reproduction. When this situation exists, adjustments in speed of the three separation negatives will adjust the color balance in one part of the scale but because of the contrast difference, the color balance will not be uniform throughout the scale and it will then be necessary to comprise by adjusting the color balance to the desired point at the most critical part of the sensitometric scale so that the undesired color balances are in the less critical areas of the scale.

It is known in the art that when black-and-white silver halide emulsions are optically sensitized they usually have a higher contrast to light having the wavelength to which they have been optically sensitized. Thus, a panchromatically sensitized emulsion usually has a higher contrast to red and to green light than it does to blue light.

It is known to add a second emulsion layer to separation negative materials in order to correct the blue exposure contrast so that it has the desired relationship with the red and green exposure contrasts of the color separation material. Another method that has been used is to process the three color separation negatives separately so that the development time and/or temperature can be adjusted in order to produce the desired correction in contrast. Obviously where machine processing facilities are used, variations in time and temperatures for the processing of the three different color separation negatives is not practical. Panchromatically sensitized black-and-white silver halide gelatin emulsions are desired for making color separation negative films which can be machine processed under essentially identical conditions and produce good color separation images having the desired red to green to blue exposure contrast relationships without the need for a second emulsion layer to correct one color contrast.

It is therefore an object of my invention to provide a novel black-and-white panchromatically sensitized silver halide hydrophilic colloid emulsion which has the desired red to green to blue exposure contrast relationship when given identical processing (as in machine processing) so the emulsion can be used advantageously as the sole light-sensitive emulsion of color separation material.

It is another object of my invention to provide a novel color separation film material which comprises a support and a panchromatically sensitized silver halide emulsion which can be given uniform processing after exposure and which will produce the desired contrast in each of the three color separations so that there is no need for a second emulsion layer as is often required in the prior art.

Another object of my invention is to provide a novel method for producing color separation negatives using the same process for each of the color separation negatives and producing the desired contrast relationships.

Still other objects will be apparent from the following specification and claims.

These and other objects are accomplished according to my invention by providing a black-and-white panchromatically sensitized silver halide emulsion that contains an incorporated removable light-absorbing dye which has its principal light absorption in the portion of the visible spectrum to which the emulsion has a high contrast so that the high contrast is lowered and the desired red to green to blue exposure contrast relationship is obtained.

My black-and-white panchromatically sensitized emulsions containing an incorporated removable light-absorbing dye are used to advantage for making my color separation materials which in their simplest form comprise a transparent film support coated with a layer of my emulsion. My color separation materials advantageously use my emulsion as the sole light-sensitive emulsion to produce with substantially identical processing conditions the desired red to green to blue exposure contrasts needed for color separations. Although other light-sensitive emulsion layers may be used in addition to my emulsion on my color separation materials, these additional emulsion layers are not needed to correct the red to green to blue exposed contrast relationship.

Preferably the removable light-absorbing dye used in my emulsions does not produce any appreciable change in the sensitivity of the silver halide, that is, preferably the light-absorbing dye is not a sensitizer and is not a desensitizer for silver halide. By removable I mean the dye is washed out of the emulsion during photographic processing or is bleached by sulfite ion in the alkaline developer solution or by the acidic fixing bath.

A green-light-absorbing, that is, magenta-colored removable light-absorbing dye is used to advantage according to my invention in a black-and-white panchromatically sensitized silver halide emulsion which has an undesirably high contrast to green light. Similarly, a blue-absorbing, that is, yellow-colored removable dye is used to advantage in my emulsions which have undesirably high contrast to blue light. Likewise a red-absorbing (cyan colored) removable dye is used to advantage in my emulsions which have an undesirably high contrast to red light.

The amount of the light-absorbing dye that is used can be varied widely and will depend upon the particular dye used and the particular silver halide emulsions used. Usually, concentrations of from 10 to 1000 milligrams of dye per mole of silver halide are used advantageously. The optimum concentration can readily be determined by dividing the emulsion to be used into a number of portions and varying the concentration of the desired dye in the various portions and then coating these emulsions, sensitometrically exposing them, processing and determining the red to green to blue exposure contrast relationships.

Any of the photographic silver halides, e.g., silver bromide, silver bromoiodide, silver chlorobromide, silver chlorobromoiodide, etc., are used to advantage in my black-and-white emulsions. The silver halide is advantageously dispersed in one or a mixture of hydrophilic colloids. These colloids include such naturally occurring materials as gelatin, albumin, agar-agar, gum arabic, alginic acid and such synthetic hydrophilic resins as polyvinyl alcohol, polyvinyl pyrrolidone, cellulose ether, partially hydrolyzed cellulose acetate, alkyl acrylate polmers, etc. Preferably the emulsions used are high speed, coarse grain silver bromoiodide gelatin emulsions.

Any of the well-known optical sensitizing dyes including the cyanine and merocyanine dyes, such as those described in U.S. Pats. 1,846,301; 1,846,302; 1,942,854; 2,112,140; 2,165,338; 2,493,747; 2,739,964; 2,493,734; 2,503,776; 2,519,001; 2,666,761; 2,734,900; 2,739,149; British Pat. 450,958; etc., are used to advantage to panchromatically sensitize my silver halide emulsions. Usually mixtures of these dyes are used to produce the desired red and green speeds as is well known in the art.

The emulsions used are advantageously chemically sensitized by well-known procedures. The emulsions can be digested in naturally active gelatin, or sulfur compounds can be added as described in U.S. Pats. 1,574,944; 1,623,499; and 2,410,689. The emulsions can be treated with salts or metals as described in U.S. Pats. 2,448,060; 2,399,083; 2,597,856; 2,597,915; etc. The emulsions can contain sensitizing amounts of reducing agents, such as, stannous salts (U.S. Pat. 2,487,850), polyamines such as are described in U.S. Pats. 2,518,698; 2,521,925; etc., and speed increasing compounds, such as, those described by U.S. Pats. 2,271,623; 2,288,226; 2,334,864; 2,866,437; etc.

Any of the well-known removable light-absorbing dyes having the desired light-absorbing characteristics may be used to advantage in my emulsions. Preferably these dyes are water-soluble dyes that have acid substituents, e.g., sulfo, sulfoalkyl, carboxy, carboxyalkyl, etc., or dyes that have dialkyl amino alkyl substituents on them so the dyes are washed out of the emulsion during photographic processing. Other dyes used to advantage are bleached by the alkaline sulfite in the developer solutions or the acidic hypo fix bath during the photographic processing. Included among removable light-absorbing dyes used to advantage are the cyanines, merocyanines, styryl, cinnamylidene, oxanol dyes, etc., such as those described in U.S. Pats. 2,298,733; 2,537,472; 2,622,082; 2,691,579; 2,843,486; 2,856,404; 3,247,127; etc. As has been mentioned before, these light-absorbing dyes have no appreciable affect on the sensitivity of the silver halide, that is, they are neither sensitizers or desensitizers. The light-absorbing dyes can be added to my emulsions without using a mordant which is desirable since mordants lower the contrast of our colors without control. However, if for some reason it is desirable to mordant my dye, particularly efficacious are combinations of acid substituted dyes with basic mordants including the mordants of Minsk U.S. Pat. 2,882,156.

Representative removable light-absorbing dyes used to advantage in my emulsions are the following typical examples.

| Dye No.: | Dye name |
|---|---|
| 1 | N-(p-dimethylaminocinnamylidene)-N,N-di-(β-naphthyl)-ammonium iodide. |
| 2 | 1-p-dimethylaminocinnamylidene-2,3-diphenylpyrrocolinium perchlorate. |
| 3 | 1-p-dimethylaminobenzylidene-2-phenyl-7,8-benzopyrrocolinium perchlorate. |
| 4 | 1-p-dimethylaminocinnamylidene-2-phenyl-7,8-benzopyrrocolinium perchlorate. |
| 5 | 1-p-dimethylaminobenzylidene-2-phenyl-6,7-benzopyrrocolinium perchlorate. |
| 6 | 5-[5-(2-p-carboxyphenyl-3-methyl-1-pyrrocolyl)-2,4-pentadienylidene]-1,3-diethyl-2-thiobarbituric acid. |
| 7 | Bis(1-n-butyl-3-carboxymethylhexahydro-2,4,6-trioxo-5-pyrimidine)pentamethinoxonol. |
| 8 | Bis(1-carboxymethylhexahydro-3-phenyl-2,4,6-trioxo-5-pyrimidine)pentamethinoxonol. |
| 9 | Bis(1-n-butyl-3-carboxymethylhexahydro-2,4,6-trioxo-5-pyrimidine)trimethinoxonol. |
| 10 | Bis(1-carboxymethylhexahydro-3-n-octyl-2,4,6-trioxo-5-pyrimidine) methinoxonol. |
| 11 | Anhydro-5'-chloro-9-ethyl-3-methyl-3'-(3-sulfobutyl)-4,5-benzothiacarbocyanine hydroxide, monosulfonated. |
| 12 | Anhydro-3,3'-diethyl-9-methyl-4,5; 4',5'-dibenzothiacarbocyanine hydroxide, disulfonated. |
| 13 | Anhydro-9-ethyl-3,3'-dimethyl-4,5; 4',5'-dibenzothiacarbocyanine hydroxide, disulfonated. |
| 14 | Anhydro-3,3',9-triethyl-5,5'-di(p-sulfophenyl)-oxacarbocyanine hydroxide. |
| 15 | Anhydro-1,1'-diethyl-2,2'-cyanine hydroxide, monosulfonated. |
| 16 | 4-[(3-ethyl-2(3H)-benzoxazolylidene)ethylidene]-3-methyl-1-p-sulfophenyl-2-pyrazolin-5-one, monosulfonated. |
| 17 | 4-[4-(3-ethyl-2-(3H)-benzoxazolylidene)-2-butenylidene]-3-methyl-1-p-sulfophenyl-2-pyrazolin-5-one, monosulfonated. |

Particularly efficacious are dyes having solubilizing groups, such as, examples 7 through 17. Dyes 7 through 10 and other oxonol dyes used to advantage include those which are represented to advantage by formula:

(I)
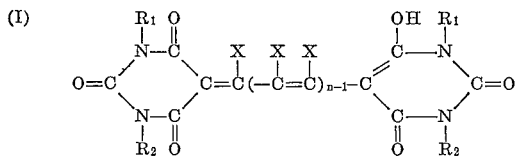

wherein $R_1$ is a carboxyalkyl group in which the carboxy substituent is attached to an alkyl group having from 1 to 2 carbon atoms such as methyl and ethyl; $R_2$ is a member selected from the class comprising of an alkyl group having from 1 to 8 carbon atoms, such as methyl, benzyl, ethyl, propyl, isopropyl, butyl, secondary butyl, tertiary butyl, hexyl, octyl, cyclohexyl, etc., an aryl group, such as phenyl, 2-methylphenyl, 2-methoxyphenyl, 2,4-di-methyl-phenyl, etc.; $n$ is an integer of from 1 to 3; X is a hydrogen atom or an alkyl group having from 1 to 4 carbon atoms such as methyl, ethyl, propyl, butyl, etc., such that not more than one X is an alkyl group.

Dyes 11 through 17 and other cyanine and merocyanine dyes having sulfo and sulfoalkyl group substituents used to advantage include those represented by the formulas:

(II)
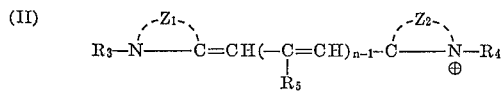

and (III)
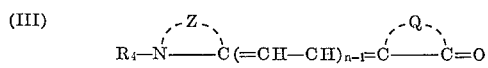

in which $R_3$ and $R_4$ each represents a lower alkyl group such as methyl, ethyl, propyl, isopropyl, butyl, secondary butyl, tertiary butyl, etc., a sulfoalkyl group in which the alkyl group has from 1 to 4 carbon atoms, such as sulfomethyl, sulfoethyl, sulfopropyl, sulfobutyl, etc., and a carboxyalkyl group in which the alkyl group has from 1 to 4 carbon atoms such as carboxymethyl, carboxyethyl, carboxypropyl, carboxybutyl, etc.; $R_5$ represents a hydrogen atom or a lower alkyl group such as methyl, ethyl, propyl, butyl, etc.; Z, $Z_1$, and $Z_2$ each represents the nonmetallic atoms necessary to complete a heterocyclic nucleus preferably a 5 or 6 membered heterocyclic nucleus, such as those of the benzothiazole series (e.g., benzothiazole, 5-chlorobenzothiazole, 4-methylbenzothiazole, 5-bromobenzothiazole, 6-phenylbenzothiazole, 4-methoxybenzothiazole, 5-iodobenzothiazole, 4 - ethoxybenzothiazole, 5-hydroxybenzothiazole, etc.); those of the naphthothiazole series (e.g., α-naphthothiazole, β-naphthothiazole, 5-methoxy-β-naphthothiazole, 5-ethyl-β-naphthothiazole, 8-methoxy-α-naphthothiazole, 7-methoxy-α-naphthothiazole, etc.); those of the benzoxazole series (e.g., benzoxazole, 5-chlorobenzoxazole, 5-methylbenzoxazole, 5-phenylbenzoxazole, 5-methoxybenzoxazole, 5-ethoxybenzoxazole, 5-hydroxybenzoxazole, etc.); those of the naphthoxazole series (e.g., α-naphthoxazole, β-naphthoxazole, etc.); those of the benzoselenazole series (e.g., benzoselenazole, 5-chlorobenzoselenazole, 5-methylbenzoselenazole, 5-hydroxybenzoselenazole, etc.); those of the naphthoselenazole series (e.g., α-naphthoselenazole, β-naphthoselenazole, etc.); those of the quinoline series including the 2-quinolines (e.g., quinoline, 3-methylquinoline, 5-methylquinoline, 7-methylquinoline, 8-methylquinoline, 6-chloroquinoline, 8-chloroquinoline, 6-methoxyquinoline, 6-hydroxyquinoline, 8-hydroxyquinoline, etc.); the 4-quinolines (e.g., quinoline, 6-methoxyquinoline, 7-methoxyquinoline, 8-methoxyquinoline, etc.); those of the isoquinoline series (e.g., the 1-isoquinolines, the 3-isoquinolines, etc.); such that Z has a sulfo-substituent, and such that at least one of the groups $Z_1$ and $Z_2$ has a sulfo-substituent; Q represents the nonmetallic atoms necessary to complete a hetero cyclic nucleus of the sulphophenyl-pyrazolone series, e.g., 3-methyl-1-p-sulfophenyl-2-pyrazolin-5-one, 3-ethyl - 1 - p-sulfophenyl-2-pyrazolin-5-one, 3-p-sulfophenyl-1-methyl-2-pyrazolin-5-one, etc.); $R_4$ represents a lower alkyl group, such as methyl, ethyl, propyl, butyl, etc.; and $n$ is the integer 1, 2 or 3.

Any of the other addenda which are used in making silver halide emulsions such as stabilizers, hardening agents, etc., are used to advantage in my emulsions.

Any of the well-known transparent support materials used in photographic elements are used to advantage in my elements including glass, cellulose acetate, cellulose nitrate, other synthetic film forming resins, e.g., the polyesters, polyamides, polystyrenes, etc.

The following examples will still further illustrate my invention.

EXAMPLE 1

A coarse grain silver bromoiodide gelatin emulsion containing approximately 4 mole percent iodide was panchromatically sensitized and divided into two portions. A first portion was coated as the control on a polyethylene terephthalate support at 510 mg. of silver and 557 mg. of gelatin per ft.² To a second portion was added the green-light-absorbing dye 4-[4-(3-ethyl-2(3H)-benzoxazolylidene) - 2 - butenylidene]-3-methyl-1-p-sulfophenyl-2-pyrazolin-5-one, monosulfonated at 208 mg. of dye per mole of silver after which it was coated as the first portion.

Both coatings were exposed on an Eastman 1B sensitometer ⅕″ to a 500W bulb modulated by Kodak Wratten filter No. 29 (red), No. 61+16 (green) and No. 35+38A (blue) and processed for 5 minutes in a developer solution at 68° F. having the composition:

| | G. |
|---|---|
| p-Methylaminophenol sulfate | 2.5 |
| Sodium sulfite, desiccated | 30. |
| Hydroquinone | 2.5 |
| Sodium metaborate octahydrate | 10.0 |
| Potassium bromide | 0.5 |
| Water to make 1 l. | |

The developed separation films were washed, fixed in a conventional alkali metal thiosulfate fixing bath, washed and dried Densitometric measurements were made of each of the separation images and the contrast values (γ) determined are summarized below.

| Filter: | Control coating, γ | Control plus green-light-absorbing dye coa'ing of invention, γ |
|---|---|---|
| Red | 2.32 | 2.26 |
| Green | 2.30 | 2.12 |
| Blue | 2.18 | 2.10 |

The results showed that the emulsion of my invention had significantly lower green exposure contrast without appreciably lowered red or blue exposure contrast. The red to green to blue exposure contrast relationship produced by the emulsion of my invention is advantageously used in preparing color separation printing plates where approximately 1.1 to 1.0 to 1.0 relationship is desired.

EXAMPLE 2

One portion of the control emulsion described in Example 1 was coated at 440 mg. of silver and 482 mg. of gelatin per ft.² on a polyethylene terephthalate support as the control. To another portion of the control emulsion was added the blue-light-absorbing dye 4-[(3-ethyl-2-benzoxazolinylidene)ethylidene]-3-methyl - 1 - p-sulfophenyl-2-pyrazolin-5-one, monosulfonated, with a mordant of the type described in U.S. Pat. 2,882,156 after which it was coated as described for the control coating in this example. Exposure and processing as in Example 1 gave the following results:

| | Control emulsion coating, γ | Control emulsion plus blue-light-absorbing dye, γ |
|---|---|---|
| Filter: | | |
| Red | 2.10 | 2.04 |
| Green | 2.30 | 2.18 |
| Blue | 2.16 | 1.94 |

This example shows that the addition of a removable blue-light-absorbing dye to my panchromatic black-and-white silver halide emulsion lowered the blue exposure contrast relative to the red and green exposure contrasts.

Similarly it can be shown that other removable green-light-absorbing, blue-light-absorbing and red-light-absorbing dyes are incorporated to advantage in still other of my panchromatic black-and-white silver halide emulsions to lower the contrast of the emulsion to green, blue and red light respectively. Any of the conventionally used silver halide developer solutions and fixing baths are used to advantage in processing my emulsions.

By incorporating in panchromatically sensitized silver halide emulsions a removable light-absorbing dye having its principal light absorption in the region of the spectrum to which the emulsion has an undesirably high contrast, the red to green to blue exposure contrasts can be adjusted to the desired relationship for use in color separation films. Use of my emulsions in color separation materials provides a substantial technical advance since no other light-sensitive emulsion layer is needed as in the prior art for contrast control especially where machine processing is to be used.

The emulsions of my invention are valuable for use in making color separation films which are advantageously used in any of the well-known color reproduction processes in which color separations are needed.

The invention has been described in detail with particular reference to preferred embodiments thereof but it will be understood that variations and modifications can be effected within the spirit and scope of the invention as described hereinabove and as defined in the appended claims.

I claim:

1. A black-and-white panchromatically sensitized silver halide emulsion for coating photographic color separation films that are designed for machine processing in which substantially identical processing conditions are used for processing each of the color separation films after image exposure, said emulsion containing an incorporated removable light-absorbing dye which has its principal light absorption in the portion of the visible spectrum to which said emulsion has a contrast that is too high to achieve the desired red to green to blue contrast ratio.

2. A black-and-white panchromatically sensitized silver halide emulsion of claim 1 in which the said removable light-absorbing dye is selected from the class consisting of (1) dyes that are bleached by at least one of the sulfite ion and the thiosulfate ion in the processing solutions during photographic processing and (2) dyes that are dissolved by the processing solutions and washed out of the emulsion during photographic processing.

3. A black-and-white panchromatically sensitized silver halide emulsion for coating photographic color separation negative film designed for machine processing in which substantially identical processing conditions are used for processing each of the color separation negatives after image exposure to produce green and blue exposure contrasts that are approximately equal and a red exposure contrast that is higher than the green and blue exposure contrast, said emulsion containing an incorporated removable light-absorbing dye which has its principal light absorption in the portion of the visible spectrum to which said emulsion has a contrast that is too high to achieve said desired red to green to blue contrast relationship.

4. A black-and-white panchromatically sensitized silver halide emulsion of claim 3 in which the light-absorbing dye is magenta-colored.

5. A black-and-white panchromatically sensitized silver halide emulsion of claim 3 in which the light-absorbing dye is 4 - [4 - (3 - ethyl-2-(3H)-benzoxazolylidene)-2-butenylidene]-3-methyl-1-p-sulfophenyl - 2 - pyrazolin-5-one, monosulfonated.

6. A black-and-white panchromatically sensitized silver halide emulsion of claim 3 in which the light-absorbing dye is yellow-colored.

7. A black-and-white panchromatically sensitized silver halide emulsion of claim 3 in which the light-absorbing dye is 4-[(3-ethyl-2 - benzoxazolinylidene)ethylidene]-3-methyl - 1 - p - sulfophenyl - 2-pyrazolin-5-one, monosulfonated.

8. A color separation negative black-and-white film comprising a support coated with a panchromatically sensitized silver halide emulsion layer containing an incorporated removable light-absorbing dye which has its principal light absorption in the portion of the visible spectrum to which said emulsion has a contrast that is too high to achieve the desired red to green to blue contrast.

9. A color separation negative black-and-white film of claim 8 in which the said dye is removed from the said film during processing.

10. A color separation negative black-and-white film of claim 8 in which the said light-absorbing dye is magenta-colored.

11. A color separation negative black-and-white film comprising a support coated with a panchromatically sensitized coarse grain silver bromoiodide gelatin emulsion containing approximately 4 mole percent iodide and containing the magenta-colored dye 4-[4-(3-ethyl-2-(3H)-benzoxazolylidene)-2-butenylidene]-3 - methyl-1-p-sulfophenyl-2-pyrazolin-5-one, monosulfonated.

12. A color separation negative black-and-white film comprising a support coated with a panchromatically sensitized coarse grain silver bromoiodide gelatin emulsion containing approximately 4 mole percent iodide and containing the yellow-colored dye 4-[(3-ethyl-2-benzoxazolinylidene)ethylidene] - 3 - methyl-1-p-sulfophenyl-2-pyrazolin-5-one, monosulfonated.

13. In a separation negative black-and-white film comprising a support coated with a panchromatically sensitized coarse grain silver halide emulsion in which the exposure contrast of the said emulsion to at least one region of the visible spectrum is too high, the improvement comprising the incorporation of a removable light-filtering dye having its principal absorption in the region of the spectrum to which the said emulsion contrast is too high so that the red to green to blue exposure contrast has a relationship of approximately 1.1 to 1 to 1 when the said film is processed under the same development conditions.

14. A method for lowering the contrast of a black-and-white panchromatically sensitized silver halide emulsion to light in one region of the visible spectrum without appreciably changing the contrast of the said emulsion to light in other parts of the visible spectrum, said method comprising the incorporation in the said emulsion of a removable light-absorbing filter dye having its principal light absorption in the region of the spectrum to which the contrast of said emulsion is to be lowered.

15. A method of claim 14 in which the contrast of the said silver halide emulsion to green light is reduced without appreciably changing the exposure contrast of the said emulsion to red and to blue light, said method comprising the incorporation in said emulsion of a removable green-light-absorbing filter dye.

16. A method of claim 14 for lowering the green exposure contrast of a black-and-white panchromatically sensitized silver halide emulsion in which the said removable green-light-absorbing dye is 4-[4-(3 - ethyl-2-(3H)-benzoxazolylidene)-2-butenylidene]-3 - methyl-1-p-sulfophenyl-2-pyrazolin-5-one, monosulfonated.

17. A method of claim 14 for lowering the blue exposure contrast of a black-and-white panchromatically sensitized silver halide emulsion in which the said removable blue-light-absorbing dye is 4-[(3-ethyl-2-benzoxazolinylidene)ethylidene]-3-methyl-1 - p - sulfophenyl-2-pyrazolin-5-one, monosulfonated.

References Cited

UNITED STATES PATENTS

| | | |
|---|---|---|
| 2,354,121 | 7/1944 | Heymer _____ 96—84 XR |
| 2,607,684 | 8/1952 | Nowak et al. _____ 96—84 XR |
| 2,865,752 | 12/1958 | Saunders et al. ____ 96—84 XR |
| 2,956,879 | 10/1960 | Van Campen _____ 96—84 XR |
| 3,177,078 | 4/1965 | Bockly et al. _____ 96—84 XR |
| 3,282,699 | 11/1966 | Jones et al. _____ 96—84 |

RONALD H. SMITH, Primary Examiner

PO-1050
(5/69)

UNITED STATES PATENT OFFICE
CERTIFICATE OF CORRECTION

Patent No. 3,531,287                    Dated     9/29/70

Inventor(s)            Eugene D. Salesin

It is certified that error appears in the above-identified patent and that said Letters Patent are hereby corrected as shown below:

Column 8, line 28, in the last line of Claim 8, delete "." and in its place add --ratio.--

SIGNED AND
SEALED
JAN 5 1971

(SEAL)
Attest:

Edward M. Fletcher, Jr.
Attesting Officer

WILLIAM E. SCHUYLER, JR.
Commissioner of Patents